United States Patent [19]
Wilkie

[11] Patent Number: 5,981,047
[45] Date of Patent: Nov. 9, 1999

[54] MATTE FINISH BIAXIALLY ORIENTED POLYPROPYLENE FILM FOR COLD SEAL RELEASE APPLICATIONS

[75] Inventor: Andrew F. Wilkie, Haverhill, Mass.

[73] Assignee: Applied Extrusion Technologies, Inc., Peabody, Mass.

[21] Appl. No.: 08/673,618

[22] Filed: Jun. 25, 1996

[51] Int. Cl.$^6$ ........................................ B32B 27/32
[52] U.S. Cl. .................. 428/215; 428/336; 428/349; 428/355 R; 428/355 AC; 428/461; 428/515; 428/516
[58] Field of Search .............................. 525/240; 428/515, 428/516, 520, 343, 220, 213, 338, 332, 335 R, 461, 215, 336, 349, 355 AC

[56] References Cited

U.S. PATENT DOCUMENTS

| | | | |
|---|---|---|---|
| 3,879,492 | 4/1975 | Bontinick | 523/100 |
| 4,870,134 | 9/1989 | Hwo | 525/221 |
| 4,882,229 | 11/1989 | Hwo | 428/461 |
| 4,929,680 | 5/1990 | Matsubara et al. | 525/240 |

*Primary Examiner*—Paul Thibodeau
*Assistant Examiner*—D Lawrence Tarazano
*Attorney, Agent, or Firm*—Caesar, Rivise, Bernstein, Cohen & Pokotilow, Ltd.

[57] ABSTRACT

A coextruded biaxially oriented polyolefin packaging film has a cold seal release layer, a core layer, and a cold seal receptive skin layer. The release layer is made of (A) about 10% to about 60% by weight ethylene-butylene random copolymer containing between 0% and about 6.0% by weight ethylene and between about 94% and 100% by weight butylene; (B) a blend of two polymers selected from the group consisting of polyethylene ionomers, syndiotactic homopolymer polypropylene, conventional polyethylenes having densities of between 0.91 and 0.965 gm/cm$^3$, and metallocene-catalyzed polyethylene plastomers; and optionally (C) a non-migratory slip agent present in an amount sufficient to decrease the coefficient of friction of the release layer. Alternatively, the release layer may be made of a two-component blend of the ethylene-butylene random copolymer and high density polyethylene. The packaging films exhibit excellent cold seal release, coefficient of friction, and a matte finish surface without the need for migratory slip additives or an overprint varnish.

33 Claims, 2 Drawing Sheets

MATTE FINISH BIAXIALLY ORIENTED POLYPROPYLENE FILM FOR COLD SEAL RELEASE APPLICATIONS

FIELD OF THE INVENTION

The present invention relates to single web or composite, oriented polyolefin, preferably polypropylene, films which have a matte finish and are useful as cold seal release films. More specifically, the present invention relates to composite, matte finish oriented polypropylene films which provide excellent cold seal release properties without relying on migratory slip and antiblock additives and without the need to treat an opposing polymeric film surface.

BACKGROUND OF THE INVENTION

Cold seal cohesives are generally natural or synthetic rubber latex compositions which, when applied to a flexible packaging substrate, allow the package to be cohesively sealed by pressure and dwell time at ambient temperature. Cold seal latex cohesives are particularly useful in wrapping products which are heat sensitive, such as confectioneries.

Flexible cold seal packaging laminates for confectioneries are known. Configurations for such laminates comprise an outer web constructed of 50 to 100 gauge biaxially oriented polypropylene (BOPP) film having a slip and antiblock modified cold seal release layer formed thereon. Reverse printed ink may then be applied to the BOPP film surface opposite the release layer, and a laminating adhesive or polyethylene extrusion is typically applied between the outer web and an inner web. The inner web typically comprises a cold seal receptive BOPP or polyethylene terephthalate (PET) metallized, clear or opaque white film having a thickness of from 32 to 150 gauge. A cold seal latex cohesive is applied in a registered pattern onto the exposed surface of the inner web.

Flexible single web cold seal packaging configurations for confectioneries are also known. Single web configurations comprise a 50 to 150 gauge cold seal receptive BOPP or PET metallized, clear or white opaque film having surface printed ink applied to one side thereof. A cold seal latex cohesive is applied in a registered pattern to an opposite side thereof. An outer surface is formed over the surface printed ink and comprises an overprint, varnish and/or overlacquer.

For the aforementioned configurations and others, cold seal cohesives are generally applied to the inside (cold seal receptive surface) of a film lamination or to a single web film. In each case, the outer film surface (facing away from the cold seal) must repel adhesion to the cold seal on the inner web so that the roll stock may be unwound when it is used to wrap a product. In the case of a single web film, the surface opposing the cold seal cohesive is typically coated with a polyamide type overlacquer to provide sufficient release from the cold seal, i.e., to prevent roll blocking.

In the case of laminated films, the outer web of the film is generally modified with migratory additives which, when sufficiently bloomed to the surface, promote a low coefficient of friction (COF) for machinability, resulting in good cold seal release (CSR) properties. It is known that migratory additives, particularly amides, coming in intimate contact with the cold seal composition surface in sufficient quantities will cause the cohesive strength of the cold seal composition to become significantly weakened. This phenomenon is known as cold seal deadening.

Biaxially oriented polypropylene film (BOPP film) by itself does not give adequate cold seal release or coefficient of friction and requires additives to accomplish these objectives. Such additives, which are predominantly migratory, have two main problems: (1) they must bloom to the film surface and remain there to be consistently effective; and (2) they have a tendency to retard the cold seal cohesive strength. The current industry standard film for such an application is a monolayer BOPP homopolymer film modified with an amide additive. The film is corona discharge treated on one or both sides but preferably an untreated surface is used for cold seal release applications.

While some good results can be achieved for certain applications with these films, they must be aged for a period of time after production and at a certain temperature so that the cold seal release and coefficient of friction additives have adequate time to sufficiently bloom to the surface. If conditions are such that the additives are not allowed to sufficiently bloom, the film is rendered non-functional.

A need therefor exists for a polypropylene packaging film formulation which provides good cold seal release without the need for migratory slip and antiblock additives.

In addition to cold seal release properties, many applications in today's packaging industry require a film having a relatively high haze, low gloss, matte finish surface. Matte-finish films are aesthetically useful for many applications. A matte-finish can be used to provide a desirable satin paper-like finish when employed as an outer surface of a packaged product. Films having a matte-finish surface are particularly useful as outer webs of laminated composite packaging films such as those used to package snack foods, bakery products, diary products, and other confectioneries such as candy. A matte finish can additionally be used to mask or minimize the appearance of oil from snack foods.

Matte-finish films are also useful as tape base films where a pressure sensitive adhesive is applied to the reverse side of the film and an overlacquer is applied to the matte-finish surface. The use of such films eliminates the need for an expensive matte coating step prior to application of the overlacquer. Matte-finish films can also be used in graphic arts applications where a non-glossy satiny-paper look is desired on an exposed surface, such as in book covers. In addition, matte-finish surfaces can generally be written on with a variety of printing inks.

Many matte-finish films are currently available but are manufactured out-of-line as coatings which are subsequently applied to an existing film surface. The matte-finish coatings generally comprise a combination of ingredients which yield a pressure sensitive adhesive layer. Such films are taught, for example, in U.S. Pat. No. 5,342,339 (the disclosure of which is herein incorporated in its entirety). Such a process involves double film handling and is uneconomical compared to coextrusion techniques. Unfortunately, none of the currently available matte-finish films exhibit cold seal release properties.

An alternative route to a matte-finish film surface has been achieved by exposing one or more surfaces of a substrate to an embossing or impression roller which physically changes the surface roughness of the substrate. Many embossing techniques are known. However, embossing and otherwise roughening the film surface renders the surface less adept to cold seal release and more adept to cold seal anchorage.

A solution to the problems of migratory slip and antiblock additives is provided in the commonly owned U.S. Pat. Nos. 5,482,780 and 5,489,473 (the entire disclosures of which are herein incorporated by reference), but the films described in these patents are relatively smooth and glossy and, like the other prior art, do not exhibit matte finish surfaces.

A need therefore exists for a packaging film or film layer which exhibits both a matte finish surface and cold seal release properties.

SUMMARY OF THE INVENTION

The present invention is based upon the discovery of a new packaging film formulation which provides both a matte finish surface and cold seal release properties. The composite films of the present invention can be reverse printed and pattern cold seal coated on a cold seal receptive surface thereof and released from the opposing cold seal release surface without the need for a cold seal release overprint varnish or migratory slip additives.

The invention relates to single or dual web polypropylene films or multilayer packaging films which can be reverse printed and/or pattern cold seal coated on a cold seal receptive surface thereof yet be releasable from the opposing release surface without the need for a cold seal release overprint varnish and/or migratory slip agents which deaden the cold seal composition. This eliminates a step in the converting process as well as reduces the overall production costs.

In another embodiment a packaging film comprises a polymeric film surface on one side of a core wherein the film surface has a matte finish and gives excellent cold seal release without relying on conventional migratory slip and antiblock additives. The other side of the core is provided with a surface treated polymeric film layer which enables excellent adhesion of a cold seal cohesive composition.

The composite films and matte finish release layers of the present invention demonstrate:

A. Good to excellent cold seal release to commercially applied cold seals cohesives.
B. Immediate and permanent cold seal release; no additive migration is required.
C. High haze, low gloss, matte finish surface.
D. Excellent and permanent coefficient of friction.
E. Good antiblock to reverse printed inks.
F. Good ink adhesion.
G. Good lamination bond strengths.
H. No cold seal deadening in finished lamination roll form.

The aforementioned properties and advantages are achieved by the present invention, for example, in one embodiment which provides a coextruded biaxially oriented polyolefin packaging film comprising a core layer having a matte-finish cold seal release layer formed on one side thereof and a cold seal receptive skin layer formed on the opposite side thereof. The cold seal release layer comprises: (A) between 10% and 60% by weight polymer selected from the group consisting of ethylene-butylene random copolymers; and (B) between 40% and 90% by weight of blend of at least two members selected from the group consisting of polyethylene ionomers, syndiotactic homopolymer polypropylene, polyethylenes having densities ranging from about 0.91 to about 0.965 gm/cm³, and metallocene catalyzed polyethylene polymers. The formulation may optionally further contain (C) a non-migratory slip agent present in an amount sufficient to decrease the coefficient of friction of the release layer. These cold seal release layer formulations, when formed on a polyolefin core layer, provide cold seal cohesive packaging films having an excellent combination of matte finish surface and cold seal release properties.

According to another embodiment of the invention, a high haze, low gloss, uniform matte finish cold seal release surface is provided by blending a two-component system of ethylene-butylene random copolymer and high density polyethylene.

In another aspect of the present invention the cold seal receptive layer opposite the release surface is coated with a cold seal cohesive composition.

In yet another aspect according to the present invention the film having a cold seal cohesive composition is used for wrapping items such as confectioneries.

BRIEF DESCRIPTION OF THE DRAWINGS

The invention may be more fully understood with reference to the accompanying drawings, wherein.

DETAILED DESCRIPTION OF THE INVENTION

THE COLD SEAL RELEASE LAYER

Figure 1:
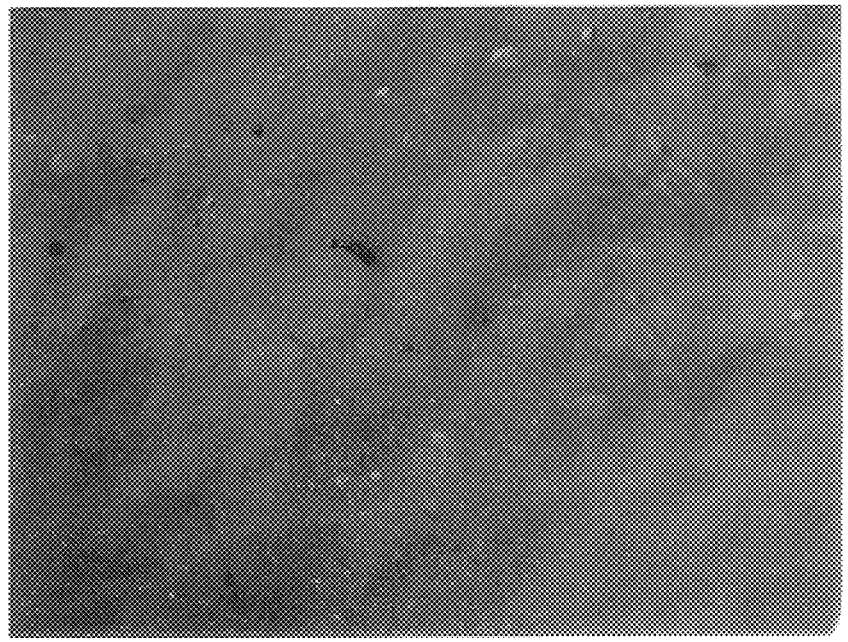
FIG. 1 is a surface photomicrograph of the film of control Example A.

The cold seal release layers of the present invention comprise a three-component system of polymers to provide excellent cold seal release and matte finish properties. The first component of the system comprises about 10% to about 60% by weight ethylene-butylene random copolymer containing between 0% and about 6.0% by weight ethylene and between about 94% and 100% by weight butylene. The ethylene content in the ethylene-butylene copolymer is preferably about 0.5% to about 6% by weight and particularly about 0.5% to 2.5% by weight. According to a preferred embodiment of the invention, the ethylene content of the ethylene-butylene copolymer is 0.5% by weight.

In a preferred embodiment of the invention, about 40% by weight ethylene-butylene random copolymer is used in the three-component system of the release layer. However, amounts in the range of from about 10% to about 60% by weight provide excellent cold seal release and a matte finish surface, with amounts above 20% by weight being preferred and amounts in the range of from about 30% to about 40% by weight being more preferred. The higher the proportion of ethylene-butylene random copolymer, or polybutylene, if the component contains no ethylene, the less pronounced is the matte finish effect.

The second and third components may be, but are not necessarily, blended together prior to addition to the first component. When first blended with each other, the second and third components of the system constitute a two-component blend, herein referred to as the "secondary blend". The second and third components may be any two polymers selected from the group consisting of polyethylene ionomers, syndiotactic homopolymer polypropylene, conventional polyethylenes having densities of between 0.91 and 0.965 gm/cm³, and metallocene-catalyzed polyethylene copolymer or terpolymer plastomers. More than two of these components may also be used in the secondary blend. These cold seal release layer formulations, when formed on a polyolefin core layer, provide cold seal cohesive packaging films having excellent combinations of properties.

The polyethylene ionomers useful in the present compositions include salts of ionomer-modified ethylenes such as 20% zinc salt of ethylene methacrylic acid ionomer. The syndiotactic homopolymer polypropylenes suitable in the component blends of the invention include those made by metallocene-catalyzed reactions. The metallocene-catalyzed polyethylene plastomers include metallocene-catalyzed ethylene-butene copolymers, metallocene-catalyzed ethylene-hexene copolymers, and metallocene-catalyzed ethylene-octene copolymers. One preferred metallocene-catalyzed copolymer is an ethylene-octene copolymer containing about 12% by weight octene units.

In a preferred embodiment of the invention, about 60% by weight of the secondary blend is used in the three-component system of the release layer. However, amounts in the range of from about 40% to about 90% by weight of the blend provide excellent cold seal release and a matte finish surface, with amounts in the range of from about 50% to about 70% by weight being more preferred.

The ratio of the two different polymers other than the polybutylene or ethylene-butylene random copolymer can range from 10% to 50% by weight for each of the other different polymers, based on the weight of the entire release layer composition. Weight ratios in the range of from 20:40 to 40:20 are preferred according to an embodiment of the invention. More preferably, the second and third components in the secondary blend are preferably provided at a weight ratio of 50:50.

According to another preferred embodiment of the invention, the release layer composition comprises 40% by weight polybutylene and 60% by weight of a secondary blend which in turn comprises a 50:50 weight ratio of (1) an ionomer-modified ethylene such as a 20% zinc salt of ethylene methacrylic acid ionomer, and (2) a metallocene catalyzed polyethylene plastomer or a metallocene catalyzed homopolymer polypropylene. According to another embodiment, each component of the three component system is present in an amount within the range of 10% to 50% by weight.

According to yet another embodiment, cold seal release layers having matte finish surfaces are also obtained by blending metallocene catalyzed polyethylenes having densities in the range of from 0.875 to 0.965 gm/cm$^3$ with polybutylene and either of a metallocene catalyzed syndiotactic homopolymer polypropylene or a linear low density polyethylene. Another composition according to the invention which provides excellent results is a blend of syndiotactic homopolymer polypropylene, with polybutylene, and a polyethylene having a density of up to 0.965 gm/cm$^3$, but preferably a linear low density polyethylene.

According to yet another embodiment of the invention, a high haze, low gloss, uniform matte finish cold seal release surface is provided by blending a two-component system of the ethylene-butylene random copolymer EBRCP (component A discussed above) and high density polyethylene (HDPE). Preferably, the two-component blend comprises from 10% to 60% by weight EBRCP and from 40% to 90% by weight HDPE, more preferably from 30% to 50% by weight EBRCP and from 50% to 70% by weight HDPE. According to one preferred embodiment, the layer comprises 40% by weight EBRCP and 60% by weight HDPE.

The film-to-film and film-to-metal coefficient of friction of the release surfaces of the present invention can benefit from the addition of a non-migratory slip agent, component (C), in an amount sufficient to decrease the coefficient of friction of the release layer to about 0.2 to 0.4. The weight quantity of such slip agent in the release layer is generally between about 0.01% and about 1% by weight. Such non-migratory slip agents useful herein can include various inorganics such as talcs, silicas—particularly syloids (micron sized silicas), glass beads, diatomaceous earth, clay and the like. A preferred non-migrating slip agent is cross-linked silicone having a particle size of from about 2 to 4.5 microns such as TOSPEARL, available from the Toshiba Company.

Non-migratory slip agents are preferably used in amounts of only up to about 1% by weight based on the weight of the cold seal release layer, particularly in the range of from about 1000 ppm to about 2000 ppm. According to a preferred embodiment of the invention, between 1000 and 10,000 ppm by weight 3$\mu$ cross-linked silicone particles is used as a slip agent, with an amount of about 2000 ppm being more preferred. Kaolin clay may also be used as a non-migratory slip agent in amounts up to about 10,000 ppm by weight, with an amount of about 1500 ppm being more preferred. According to another embodiment, both of these agents are used.

Another preferred additive for the cold seal release layer is stearamide. If used, amounts of up to, and including, 2500 ppm are preferred.

To further enhance slip and release properties of the film, relatively minor amounts of migratory slip/anti-block and anti-static agents, such as amides, stearates and amines can optionally be added to the skin and/or core layers to facilitate the main film functions. Such agents can be used in quantities of up to about 1.0% by weight and preferably from about 0.05% to about 0.5% by weight of such layer. The use of these additives, however, is limited by the propensity to deaden the cold seal composition in the end use application. Exemplary optional additives include between 0 and 10,000 ppm of each of the following: saturated and unsaturated amides having from 16 to 22 carbon atoms; stearates, particularly zinc stearate and calcium stearate; silicone oil; glycerol monostearate; amines; and finely divided inorganic particles. High density polyethylene may also be used as a slip and/or antiblock additive at up to 3% by weight.

Corona discharge treating the cold seal release surface of the present film substantially diminishes the heat sealing temperature use range, however, the cold seal release properties remain excellent. By "heat seal" herein is meant temperatures generally in excess of 1500° F. For many packaging operations, such temperatures are unacceptable.

The thickness of the release layer is preferably within the range of from about 1 to about 20 gauge, with the range of from about 2 to about 10 gauge being more preferred. According to one preferred embodiment of the invention, the release layer has a thickness of 5.5 gauge.

The cold seal release layer is typically coextruded on one surface of an isotactic homopolymer polypropylene core layer and oriented by either the conventional blown film or tenter frame processes. The release layer is preferably left non-corona treated. The layer may comprise between about 1% and about 30% of the thickness of the total structure. According to one embodiment of the invention, the release layer thickness is between 3.0% and 10.0% of the thickness of the entire film structure.

THE CORE LAYER

The core layer of the films of the present invention is predominantly isotactic polypropylene homopolymer. It can include small quantities, e.g., less than about 10%, e.g., up to 8% of other polymers such as alpha-olefin polymers having about 2 to 4 carbon atoms, e.g., ethylene-propylene random copolymer, ethylene-propylene block copolymer and high density polyethylene. The quantity of high density polyethylene is generally limited to less than 5% such as up to about 4.5% by weight. Preferably not more than about 4% of such other polymers are included in the core so as not to adversely effect the stiffness and other physical properties of the oriented polypropylene. According to a preferred embodiment, the core comprises as much as 99.2% by weight isotactic homopolymer polypropylene.

According to another embodiment of the invention, the core layer comprises up to 100% by weight polyethylene having a density in the range of from 0.91 to 0.965 gm/cm$^3$.

Optionally, small quantities of migratory additives can be included in the core layer such as amides, including erucamide, behenamide or glycerol monostearate, or amines. Other additives such as calcium stearate, or inorganics such as silicone oil, can also be added to the core layer, but these are often more useful when used within the release layer.

According to one exemplary embodiment of the invention, the core layer has a thickness of 69.5 gauge and comprises 99.2% by weight isotactic homopolymer polypropylene, 1,000 ppm high density polyethylene, 800 ppm erucamide, 2700 ppm stearamide, and 2700 ppm behenamide. Preferably, the cold seal release layer has a non-treated release surface, whereas the core preferably has an exposed corona-treated surface or an exposed corona-treated receptive skin layer for receiving the cold seal cohesive.

The thickness of the core layer can vary widely between about 40 to about 200 gauge, with a maximum thickness of 150 being preferred and a range of about 50 to about 70 gauge being more preferred for many applications. According to one preferred embodiment of the invention, the core has a thickness of 69.5 gauge. According to another preferred embodiment, the core comprises isotactic homopolymer polypropylene having a thickness of 69.5 gauge. One or both surfaces of the core layer may be corona treated or otherwise surface treated.

Alternatives to the core layer formulation include replacing the isotactic homopolymer polypropylene discussed in the preferred formulation above with other polyolefins, such as 100% by weight polyethylene having a density in the range of from 0.91 to 0.965 gm/cm$^3$, polybutylene polymers, high crystallinity (high isotactic) polypropylene, syndiotactic polypropylene, ethylene-propylene random copolymers, ethylene-propylene block copolymers, propylene-butylene copolymers, ethylene-propylene-butylene terpolymers, and propylene polymers modified with up to about 30% by weight low molecular weight hydrocarbon tackifier. High density polyethylene can be used in the core layer in amounts ranging from 0 to 5% by weight.

Other optional additives include small quantities of migratory additives such as amides, including erucamide, behenamide, stearamide, other $C_{16}$–$C_{22}$ saturated and unsaturated fatty acid amides, and glycerol monostearate, each from 0 to 10,000 ppm, and/or amines from 0 to 1000 ppm. Other inorganics such as calcium stearate or silicone oil can also be added to the core layer, but are often more useful when used in the cold seal release layer. The core layer is preferably corona discharge treated, flame treated, chemical treated, or both corona and flame treated. Although not a preferred embodiment, the core layer can contain opacifying agents, such as fillers, or air cavities, such as formed by mechanical cavitation or inclusion of a chemical blowing agent.

THE COLD SEAL RECEPTIVE LAYER

If a cold seal receptive layer or "bonding layer" is provided, the cold seal receptive layer is preferably from about 0.25 to 20 gauge in thickness and is coextruded or extrusion coated with a layer fabricated of an ethylene-propylene random copolymer, an ethylene-propylene-butylene terpolymer, a polyethylene having a density in the range of from about 0.91 to about 0.965 gm/cm$^3$, a polyethylene plastomer, or a functionally modified polyolefin.

Preferred ethylene-propylene random copolymers for the receptive layer include those containing about 2% to about 8% by weight ethylene and about 92% to about 98% by weight propylene. A preferred receptive layer contains from 3% to 5% by weight ethylene and from 95% to 98% by weight propylene.

The surface of the cold seal receptive layer is subjected to a physical surface-modifying treatment to improve the bond between that surface and the subsequently applied cold seal composition. A preferred treatment is to subject the exposed surface of such layer to a high voltage electrical stress accompanied by corona discharge. Other such surface modifying treatments include flame treatment of the surface of such layer or any combination of flame and corona treatments sequentially or simultaneously.

Any of the following polyolefin polymers can also be used for the cold seal receptive surface composition and are preferably corona and/or flame treated: homopolymer polyethylenes; isotactic polypropylene; syndiotactic polypropylene; butylene homopolymers; butylene copolymers with ethylene containing up to 6.0% by weight polyethylene; ethylene-propylene block copolymers; ethylene-propylene random copolymers; random copolymers containing up to 10% by weight ethylene units; high impact ethylene-propylene rubber-modified elastomers containing greater than 10% by weight ethylene units; ethylene-propylene-butylene terpolymers; ethylene-butylene metallocene catalyzed copolymers; ethylene-hexene metallocene catalyzed copolymers; ethylene-octene metallocene catalyzed copolymers; propylene-butylene copolymers; ethylene-butylene copolymers having butylene as a minor component; and propylenes modified with low molecular weight hydrocarbon tackifiers. Suitable polyethylenes for the receptive layer are ultra low density polyethylene (ULDPE), very low density polyethylene (VLDPE), linear low density polyethylene (LLDPE), medium density polyethylene (MDPE), and high density polyethylene (HDPE) including, but not limited to, polyethylenes having densities of between about 0.91 and about 0.965 gm/cem$^3$.

Other compositions which may be suitable for the cold seal receptive layer of the present invention include any of the foregoing or any combination thereof blended with a functionally modified polyolefin to form a polymeric composition for the cold seal receptive layer. Such functionally modified polymers include those containing: ethylene vinylacetate (EVA); ethylene methacrylic acid (EMA); terpolymers of ethylene with vinylacetate, acrylic acid and/or methacrylic acid; ethylene butylacrylate (ENBA); and maleic anhydride modified polyolefins.

The cold seal receptive skin layer can optionally also contain an adhesion promoting agent to improve adhesion to the cold seal composition. Such adhesion promoters include powdered polyamides, e.g., Nylon 6, clay, random alpha-olefin copolymers of 1 to 4 carbon atoms as well as polar polymers such as those containing acrylic or methacrylic acid in a quantity sufficient to enhance adhesion of the cold seal composition to the treated skin surface.

The receptive layer, and/or the core layer, can be treated in any conventional way, e.g., corona discharge or flame ionization, for printing and adhesion purposes. The matte finish effect of the high haze, low gloss films of the present invention can be further enhanced by printing the reverse surface of the film as is customary in the film converting process.

Films of the present invention exhibit excellent cold seal release to commercially applied cold seal compositions. Release is immediate from the time of manufacture, without aging, and remains permanent and consistent through aging. Unlike prior art film, no additive migration is necessary to achieve desired release. In fact, migratory release additives are not required in the present cold seal release layer of the invention, but are preferred. Additionally, good anti-block to reverse printing inks and good ink adhesion and lamination bond strengths on print or laminating surfaces are obtained by the present invention. In addition, according to the present invention, minimal to zero cold seal deadening in the final film is observed.

Manufacture of the polyolefin film according to this invention is carried out by known processes such as coextrusion of the various layers. This includes coextruding through a flat film die the melt corresponding to the individual polymeric layers of the film, cooling the film obtained by coextrusion in order to harden it, orienting, e.g., biaxially stretching the film, heat-setting the stretched film and surface modifying the surface, e.g., corona or flame treating the cold seal receptive layer and optionally surface treating the release layer such as when it is desired to print thereon. The film can also be coextruded by the blown film or double bubble orientation process.

The composite film structure comprising the core and adherent cold seal release and cold seal receptive skins is stretched by conventional techniques to orient the film, prior to surface treatment such as by corona discharge or flame treatment. Orientation may be effected uniaxially, by stretching the film in one direction, or biaxially, by stretching the film in each of two mutually perpendicular directions in the plane of the film. Conventional mono and biaxial orientation film manufacturing techniques are preferred. The film can also be produced via the interdraw process, i.e., extrusion coating onto the machine direction oriented sheet prior to transverse direction orientation.

The degree to which the film is stretched depends to some extent on the ultimate use for which the film is intended. Preferably, the film is stretched to between about 4 and about 6.5 times its original dimension in the longitudinal direction and to between about 5 and about 10 times in the transverse direction. The longitudinal stretching is expeditiously carried out with the aid of two rolls running at different speeds according to the stretch ratio desired and the transverse stretching with the aid of a corresponding tenter frame. Migratory additives in the core layer are preferred in small amounts to assist in high speed stretching and machinability of the film surface.

After stretching, the polymeric film is normally "heat set", while restrained against shrinkage at a temperature above the glass transition temperature of the polymer and below its melting point.

Prior to application of the cold seal cohesive onto the exposed surface of the cold seal receptive layer, such layer is subjected to a physical surface-modifying treatment to improve the bond between that surface and the subsequently applied cold seal cohesive. A preferred treatment is to subject the exposed surface to a high voltage electrical stress accompanied by corona discharge. The surface modification may instead include flame treatment, chemical treatment, or any combination of flame, chemical and corona treatments. The film is then heat aged to impart further dimensional stability to the film.

In case the release layer of the film is to be printed, the surface of such layer may be modified by corona discharge or flame treatment, although in many cases such treatment deteriorates cold seal release properties.

The thickness of the composite film of the present invention can vary over a wide range but is most preferably from about 40 to about 150 gauge.

The cold sealing process of the present invention is preferably achieved at a temperature of less than 150° F., and more preferably at a temperature range of from 65° F. to 85° F. In the cold sealing process of the present invention, the films of the invention are subjected to a sufficient pressure for a sufficient time to achieve the desired cold seal. The time needed for pressure application to achieve cold sealing can be from about 0.1 to about 1 second, depending upon the cohesive used, the amount of pressure applied, and other factors. This range of times, however, should not be construed as a limitation of the present invention. In one embodiment, the cold seal pressure can be from about 20 to 100 psi, and more preferably is from 70 to 90 psi.

The resulting cold sealed films of the present invention preferably exhibit a release force of from about zero to about 75 grams/inch, with the range of 5 to 50 grams per inch being preferred.

EXAMPLES

Matte finish cold seal release polymeric layers without additives were coextruded in a conventional ¾ inch satellite extruder equipped with a grooved feed throat and Maddox mixing section 24:1 length to diameter (L/D) polyethylene type screw. The main core layer consisted solely of isotactic homopolymer polypropylene (PP) and was extruded through a one inch diameter extruder equipped similarly to the satellite extruder. The cold seal release (CSR) layer comprised about 5% to about 15% of the total extruded cast sheet thickness. The coextruded sheet was subsequently biaxially oriented 6× by 6× on a laboratory T.M. Long film orienter. A total of 14 skin layer formulation examples including a laboratory control are given in Table I. The corresponding cold seal cohesive strengths and optics properties for each example are also shown in Table I.

The experimental films were examined for optical properties including % haze and 45° gloss and then for cold seal release properties with commercially supplied cold seal structures. Each matte finish cold seal release layer formulation, other than the control surface of isotactic polypropylene contained 40% by weight of an ethylene-butylene random copolymer containing about 0.5% by weight ethylene units, herein denoted EBRCP. Blending the EBRCP with an ethylene-propylene random copolymer (EPRCP) yielded a clear and glossy film. Blending the EBRCP with homopolymer polypropylene also resulted in a clear and glossy film. Blends of syndiotactic homopolymer polypropylene produced by metallocene catalyst technology and conventional linear low density polyethylene also yielded good release properties but insufficient haze and gloss properties to exhibit a matte finish surface.

Of the two-component systems tested, the most desirable matte finish cold seal release surface was found by blending 40% by weight of the EBRCP with 60% by weight high density polyethylene (HDPE), Example N, which yielded 45–50% haze and 20 gloss units at 45°. These values are relative to the values of the isotactic homopolymer polypropylene control, Example A, and the control blend of 40% by weight EBRCP and 60% by weight EPRCP, Example B, which have very low haze at less than or equal to 1%, and very high gloss at greater than or equal to 94 units.

Most embodiments of the present invention are based upon the discovery that excellent cold seal release, higher haze and lower gloss can be attained if a third component is added to the two-component blends discussed above. For instance, Examples C and F shown in Table I demonstrate the increase in haze and decrease in gloss achieved when an ethylene-butylene copolymer plastomer (Example C) or an ethylene-based terpolymer plastomer (Example F) is blended into a two-component system of EBRCP and linear low density polyethylene (LLDPE).

In Examples D and G a primary blend of syndiotactic homopolymer polypropylene (SPP) and EBRCP was blended with an ethylene-butylene copolymer plastomer (Example D) or an ethylene-based terpolymer plastomer (Example G) to increase haze and decrease gloss while maintaining excellent cold seal release relative to the properties of the primary blend. In Examples E and H, the same plastomers used in Examples D and G, respectively, were blended at 30% by weight with 40% by weight EBRCP and 30% by weight ionomer to yield a significant increase in haze and decrease in gloss accompanied by an unexpectedly improved cold seal release relative to the controls. The ionomer was a 20% by weight zinc salt of ethylene methacrylic acid ionomer. A three-component system of SPP, LLDPE and EBRCP, Example I, also yielded high haze and low gloss with good cold seal release.

Figure 2:
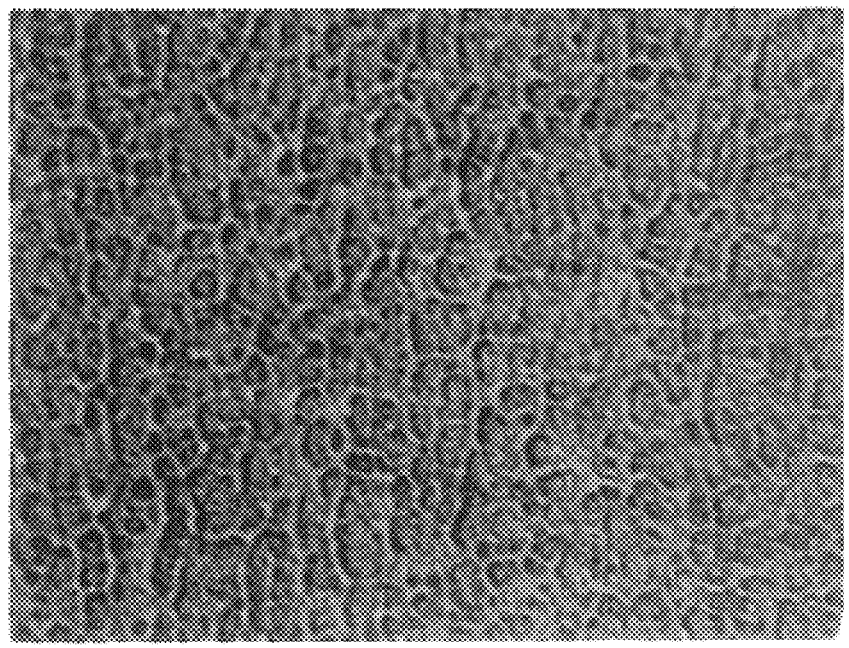
FIG. 2 is a surface photomicrograph of the film of inventive Example E.
Figure 3:
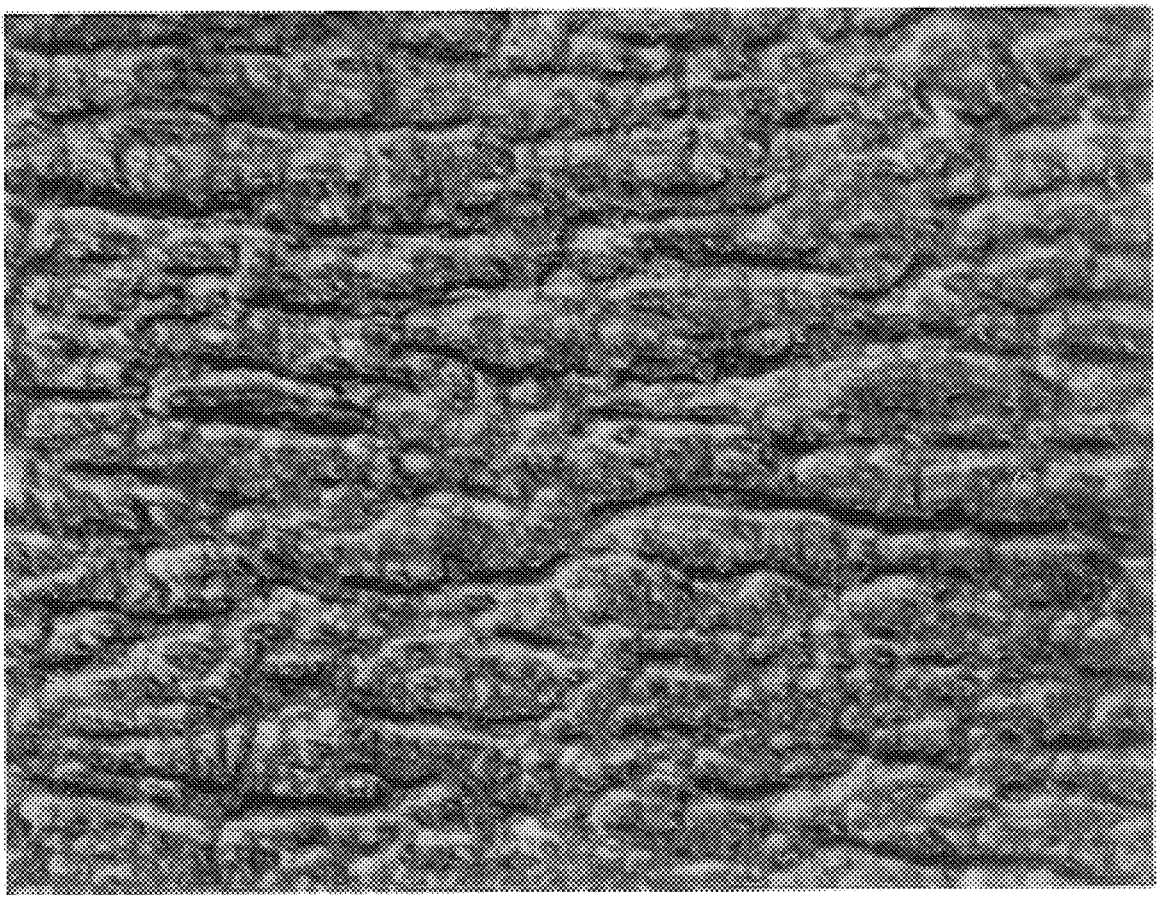
FIG. 3 is a surface photomicrograph of the film of inventive Example F.

Surface photomicrographs of selected cold seal release films are shown in FIGS. 1–3. The photomicrographs were taken in bright field top lighting using a differential interference light contrast (DIC) light microscope at 200× power. The glossy control film Example A, shown in FIG. 1, demonstrates a very smooth flat surface whereas the inventive matte finish cold seal release films had varying degrees of roughness and discontinuity. FIGS. 2 and 3 correspond to Examples E and F, respectively. Both inventive Examples E and F exhibit rough, uniform matte finishes, particularly when compared to the glossy control film of Example A, shown in FIG. 1.

The highest haze/lowest gloss films, Examples E, H and J, have a pronounced interpenetrating network of disruptions as evidenced by the crisscross of clear area lines. The remaining inventive Examples had lower haze and higher gloss values but nonetheless demonstrate disruptions or roughness which tends to be more linear or row-like in appearance. In terms of the macro effect on haze and gloss, it appears that the crisscross network is more desirable for a matte surface effect.

TABLE I

Cold Seal Block Force[1] in gms/in.

| Example | Cold Seal Film[2] Release Surface Composition (Weight %) | Commercial Cold Seal A | Commercial Cold Seal B | Film Haze % | Release Film Surface 45° Gloss units |
|---|---|---|---|---|---|
| A | Isotactic homopolymer polypropylene (100) | 75 | 110 | 0.3 | 96 |
| B | Ethylene-propylene random copolymer (5.0% ethylene) (60) Ethylene-butylene (0.5% ethylene) random copolymer (EBRCP) (40) | 35 | 90 | 1.0 | 94 |
| C | Ethylene-butylene metallocene catalyzed plastomer (30) Linear low density polyethylene (LLDPE) (30) EBRCP (40) | 35 | 75 | 39–48 | 23 |
| D | Ethylene-butylene metallocene catalyzed plastomer (30) Syndiotactic homopolymer polypropylene (SPP) (30) EBRCP (40) | 30 | 55 | 28 | 32 |
| E | Ethylene-butylene metallocene catalyzed plastomer (30) 20% by weight zinc salt of ethylene methacrylic acid ionomer (EMA ionomer) (30) EBRCP (40) | 25 | 55 | 60–68 | 11 |
| F | Ethylene-propylene-butylene metallocene catalyzed terpolymer plastomer (30) LLDPE (30) EBRCP (40) | 30 | 75 | 34–37 | 29 |
| G | Ethylene-propylene-butylene metallocene catalyzed terpolymer plastomer (30) SPP (30) EBRCP (40) | 35 | 40 | 12–17 | 51 |
| H | Ethylene-propylene-butylene metallocene catalyzed terpolymer plastomer (30) EMA ionomer (30) EBRCP (40) | 25 | 45 | 56–66 | 12 |
| I | SPP (30) LLDPE (30) EBRCP (40) | 30 | 60 | 25–31 | 31 |
| J | SPP (30) EMA ionomer (30) EBRCP (40) | 25 | 55 | 52–59 | 16 |
| K | Ethylene-butylene metallocene catalyzed plastomer (60) EBRCP (40) | 35 | 75 | 27–34 | 25 |
| L | LLDPE (60) | 30 | 70 | 25 | 40 |

TABLE I-continued

Cold Seal Block Force[1] in gms/in.

| Example | Cold Seal Film[2] Release Surface Composition (Weight %) | Commercial Cold Seal A | Commercial Cold Seal B | Film Haze % | Release Film Surface 45° Gloss units |
|---|---|---|---|---|---|
| M | EBRCP (40) SPP (60) | 25 | 15 | 8.8 | 57 |
| N | EBRCP (40) High density polyethylene (60) EBRCP (40) | 20 | 40 | 45–50 | 20 |

[1]Block conditions: 2 sec. moisture/ambient temp./2,500 lbs. load (500 psi) 30 min./2 hrs. 40° C. conditioning with 1 lb. load.
[2]Laboratory produced, coextruded onto a base homopolymer polypropylene, then biaxially oriented 36/1 to produce a film of about 0.0075 inch thick.

Although the present invention has been described in connection with preferred embodiments, it will be appreciated by those skilled in the art that additions, modifications, substitutions and deletions not specifically described may be made without departing from the spirit and scope of the invention defined in the appended claims. For example, although the packaging films of the invention have been described in terms of one, two or three layer films, it is to be understood that films having additional layers such as a metallized layer or other polymeric layers are also within the scope of the present invention.

What is claimed is:

1. A packaging film comprising:
   I) a cold seal release layer forming one surface of said film: said cold seal release layer comprising:
      A) about 10% to about 60% by weight, butylene homopolymer or ethylene-butene random copolymer containing up to about 6% by weight ethylene and at least 94% by weight butylene;
      B) about 40% to about 90% by weight of a blend of at least two polymers selected from the group consisting of polyethylene ionomers, syndiotactic polypropylene homopolymer, polyethylenes having a density in the range of 0.91 to 0.965 gm/cm$^3$, and metallocene-catalyzed polyethylene plastomers; and optionally
      C) a non-migratory slip agent present in an amount sufficient to decrease the coefficient of friction of the release layer; and
   II) a cold seal cohesive on the surface of the packaging film opposite said cold seal release layer.

2. The cold seal release layer of claim 1, wherein component (A) is present in an amount of between about 30% and about 50% by weight, and component (B) is present in an amount of between about 50% and about 70% by weight.

3. The cold seal release layer of claim 1, wherein component (A) comprises about 40% of said release layer and component (B) comprises about 60% by weight of said release layer.

4. The cold seal release layer of claim 1, wherein component (A) contains between about 0.5% and about 6.0% by weight ethylene and between about 94% and about 99.5% by weight butylene.

5. The cold seal release layer of claim 1, wherein component (B) comprises about a 50:50% by weight blend of two of said polymers.

6. The cold seal release layer of claim 1, wherein component (C) is present and comprises between about 1000 ppm and about 2000 ppm by weight, based on the total weight of the cold seal release layer, of at least one member selected from the group consisting of crosslinked silicone particles having an average particle size of between about 2 and about 4.5 microns and inorganic finely divided clay.

7. The cold seal release layer of claim 1, wherein component (C) is present and comprises between about 1,000 and about 2000 ppm by weight crosslinked silicone particles having an average particle size of between about 2 and about 4.5 microns, and between about 1,000 and about 2000 ppm by weight kaolin clay.

8. The cold seal release layer of claim 1, wherein said cold seal release layer has a layer thickness of between about 2 and about 10 gauge.

9. A coextruded biaxially oriented polyolefin packaging film comprising:
   I) a cold seal release layer forming one surface of said film: said cold seal release layer comprising:
      A) about 10% to about 60% by weight, butylene homopolymer or ethylene-butene random copolymer containing up to about 6% by weight ethylene and at least 94% by weight butylene;
      B) about 40% to about 90% by weight of a blend of at least two polymers selected from the group consisting of polyethylene ionomers, syndiotactic polypropylene homopolymer, polyethylenes having a density in the range of 0.91 to 0.965 gm/cm$^3$, and metallocene-catalyzed polyethylene plastomers; and optionally
      C) a non-migrator slip agent present in an amount sufficient to decrease the coefficient of friction of the release layer;
   II) a cold seal cohesive on the surface of the packaging film opposite said cold seal release layer; and
   III) a core layer located between said cold seal cohesive and said cold seal release layer, in which said core layer comprises a polyolefin polymer.

10. The film of claim 9, wherein component (A) is present in an amount of between about 30% and about 50% by weight, and component (B) is present in an amount of between about 50% and about 70% by weight.

11. The film of claim 9, wherein component (A) comprises about 40% of said release layer and component (B) comprises about 60% by weight of said release layer.

12. The film of claim wherein claim 9, said blend contains between about 0.5% and about 5.0% by weight ethylene and between about 95% and about 99.5% by weight butylene.

13. The film of claim 9, wherein component (B) comprises about a 50:50% by weight blend of two of said polymers.

14. The film of claim 9, wherein component (C) is present and comprises between about 1000 ppm and about 2000 ppm by weight, based on the total weight of the cold seal release layer, of at least one member selected from the group consisting of crosslinked silicone particles having an average particle size of between about 2 and about 4.5 microns and inorganic finely divided clay.

15. The film of claim 9, wherein component (C) is present and comprises between about 1,000 and about 2000 ppm by weight crosslinked silicone particles having an average particle size of between about 2 and about 4.5 microns, and between about 1,000 and about 2000 ppm by weight kaolin clay.

16. The film of claim 9, wherein said cold seal release layer has a layer thickness of between about 2 and about 10 gauge.

17. The film of claim 9, wherein said cold seal release layer has a layer thickness of between about 2 and about 10 gauge, and said core has a thickness of between about 40 and about 200 gauge.

18. The film of claim 9, wherein a side of said core opposite the side having the release layer thereon has been surface modified.

19. The film of claim 9, wherein a side of said core opposite the side having the release layer thereon has been treated with at least one treatment selected from the group consisting of corona discharge treatments and flame treatments.

20. The film of claim 9, wherein said core layer comprises at least one member selected from the group consisting of isotactic homopolymer polypropylene, ethylene-propylene random copolymers, ethylene-propylene block copolymers, polyethylene having a density of between 0.91 and 0.965 gm/cm$^3$, and mixtures thereof.

21. The film of claim 9, wherein said core layer comprises isotactic homopolymer polypropylene.

22. The film of claim 9, wherein said core layer consists of isotactic homopolymer polypropylene.

23. A coextruded biaxially oriented polyolefin packaging film comprising:
   I) a cold seal release layer forming one surface of said film: said cold seal release layer comprising:
      A) about 10% to about 60% by weight, butylene homopolymer or ethylene-butene random copolymer containing up to about 6% by weight ethylene and at least 94% by weight butylene;
      B) about 40% to about 90% by weight of a blend of at least two polymers selected from the group consisting of polyethylene ionomers, syndiotactic polypropylene homopolymer, polyethylenes having a density in the range of 0.91 to 0.965 gm/cm$^3$, and metallocene-catalyzed polyethylene plastomers; and optionally
      C) a non-migratory slip agent present in an amount sufficient to decrease the coefficient of friction of the release layer;
   II) a cold seal cohesive on the surface of the packaging film opposite said cold seal release layer;
   III) a core layer located between said cold seal cohesive and said cold seal release layer, in which said core layer comprises a polyolefin polymer; and
   IV) a cold seal cohesive receptive skin layer located on the side of the core layer which is coated with said cold seal cohesive, said receptive skin layer comprises a polyolefin polymer.

24. The film of claim 23, wherein component (A) is present in an amount of between about 30% and about 50% by weight, and component (B) is present in an amount of between about 50% and about 70% by weight.

25. The film of claim 23, wherein component (A) comprises about 40% of said release layer and component (B) comprises about 60% by weight of said release layer.

26. The film of claim 23, wherein component (B) contains between about 0.5% and about 5.0% by weight ethylene and between about 95% and about 99.5% by weight butylene.

27. The film of claim 23, wherein component (B) comprises about a 50:50% by weight blend of two of said polymers.

28. The film of claim 23, wherein said cold seal receptive skin layer has been treated with at least one treatment selected from the group consisting of corona discharge treatments and flame treatments.

29. The film of claim 23, wherein said cohesive is a cold seal latex cohesive.

30. The film of claim 23, further including a metallized layer.

31. A packaging film comprising:
   I) a cold seal release layer forming one surface of said film: said cold seal release layer comprising:
      A) about 10% to about 60% by weight, butylene homopolymer or ethylene-butene random copolymer containing up to about 6% by weight ethylene and at least 94% by weight butylene,
      B) about 40% to about 90% by weight high density polyethylene, and optionally
      C) a non-migratory slip agent present in an amount sufficient to decrease the coefficient of friction of the release layer, and
   II) a cold seal cohesive on the surface of the packaging film opposite said cold seal release layer.

32. The cold seal release layer of claim 31, wherein component (A) is present in an amount of between about 30% and about 50% by weight, and component (B) is present in an amount of between about 50% and about 70% by weight.

33. The cold seal release layer of claim 31, wherein component (A) comprises about 40% of said release layer and component (B) comprises about 60% by weight of said release layer.

* * * * *